(12) United States Patent
Cosgrove, Jr.

(10) Patent No.: US 10,102,115 B2
(45) Date of Patent: Oct. 16, 2018

(54) INCREMENTAL PROGRAM CONSTRUCTION FROM EMBEDDED PROGRAM CODE FOR EXTERNAL TESTING

(71) Applicant: CA, Inc., New York, NY (US)

(72) Inventor: David William Cosgrove, Jr., Portsmouth, NH (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/352,557

(22) Filed: Nov. 15, 2016

(65) Prior Publication Data
US 2018/0137041 A1 May 17, 2018

(51) Int. Cl.
*G06F 9/44* (2018.01)
*G06F 11/36* (2006.01)

(52) U.S. Cl.
CPC ...... *G06F 11/3696* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 6,708,326 B1 * | 3/2004 | Bhattacarya | ......... | G06F 11/362 712/227 |
| 7,765,531 B2 * | 7/2010 | Gilbert | ............. | G06F 17/30595 717/141 |
| 9,779,133 B2 * | 10/2017 | Bhagavan | ......... | G06F 17/30424 |
| 2003/0066053 A1 * | 4/2003 | Al-Azzawe | ......... | G06F 11/3624 717/127 |
| 2004/0243598 A1 * | 12/2004 | Sleeper | ............ | G06F 17/30415 |
| 2007/0078825 A1 * | 4/2007 | Bornhoevd | ......... | G06F 11/3409 |
| 2010/0005340 A1 * | 1/2010 | Belknap | ............. | G06F 11/3688 714/37 |
| 2011/0307871 A1 * | 12/2011 | Branda | ............... | G06F 11/3644 717/129 |
| 2012/0159451 A1 * | 6/2012 | Bates | ................. | G06F 11/3664 717/125 |
| 2013/0007718 A1 * | 1/2013 | Bates | .................... | G06F 11/362 717/125 |

(Continued)

*Primary Examiner* — Insun Kang
(74) *Attorney, Agent, or Firm* — Gilliam IP PLLC (57) ABSTRACT

An application can include program code in multiple programming languages. Typically, a primary or host application program code will include secondary program code of at least one other programming language embedded within the primary application program code. A selective testing framework can be designed that efficiently evaluates embedded program code separately from the host application program code. The selective testing framework records specified embedded program code detected during execution of the application. Recording the embedded program code while the application executes allows the selective testing framework to incrementally construct an independently testable program in accordance with execution of the application. The testing framework can then test the constructed program code as it would run within the application, but test it external to and independent of the application. Without the overhead of executing the primary program code (e.g., compiling and building an installer), embedded program code can be efficiently evaluated.

20 Claims, 5 Drawing Sheets

(56) References Cited

U.S. PATENT DOCUMENTS

| | | | |
|---|---|---|---|
| 2014/0181798 A1* | 6/2014 | Narayanan | G06F 8/427 |
| | | | 717/143 |
| 2014/0344625 A1* | 11/2014 | Thatte | G06F 11/3636 |
| | | | 714/38.1 |
| 2016/0062870 A1* | 3/2016 | Menahem | G06F 11/362 |
| | | | 717/125 |
| 2016/0147637 A1* | 5/2016 | Bhagavan | G06F 17/30424 |
| | | | 717/127 |
| 2017/0169068 A1* | 6/2017 | Kennedy, Jr. | G06F 17/30371 |
| 2017/0206245 A1* | 7/2017 | Zhang | G06F 17/30427 |

\* cited by examiner

INCREMENTAL PROGRAM CONSTRUCTION FROM EMBEDDED PROGRAM CODE FOR EXTERNAL TESTING

BACKGROUND

The disclosure generally relates to the field of data processing, and more particularly to software development, installation, and management.

An extraction, transformation, and loading (ETL) process extracts data from homogenous or heterogeneous sources, transforms the format of the extracted data to conform to a specified model and schema, and loads the transformed data into a target system (e.g., data warehouse). ETL is used to efficiently migrate data from various sources to a unified central repository. Data consolidated in a unified central repository are commonly used in business intelligence applications.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to an ETL process in illustrative examples. Embodiments of this disclosure can be applied to shell scripts. In other instances, well-known instruction instances, protocols, structures, and techniques have not been shown in detail in order not to obfuscate the description.

Overview

An ETL process may use a secondary programming language, such as Structured Query Language (SQL), to access and update a database. An application can embody the ETL process or a part of the ETL process and may be written in a primary programming language different than the SQL code with the SQL program code embedded within the application. Iterative code changes to the ETL application incur expensive testing. For instance, prior to testing code changes, the application is compiled, an installer is built, and then the application is deployed in a test environment. This testing process is repeated for changes applied to the application code and/or the embedded program code. Time spent repeatedly compiling, building an installer, and deploying the application in test environments may delay the release of the application to production and increases development costs.

An application can include program code in multiple programming languages. Typically, a primary or host application program code will include secondary program code of at least one other programming language embedded within the primary application program code. For instance, an ETL application can be primarily written in the Java® programming language with embedded SQL program code for accessing and updating a database. A selective testing framework can be designed that efficiently evaluates embedded program code separately from the host application program code. The selective testing framework records specified embedded program code detected during execution of the application. Recording the embedded program code while the application executes allows the selective testing framework to incrementally construct an independently testable program in accordance with execution of the application. The testing framework can then test the constructed program code as it would run within the application, but test it external to and independent of the application. Without the overhead of executing the primary program code (e.g., compiling and building an installer), embedded program code can be efficiently evaluated.

Example Illustrations

Figure 1:
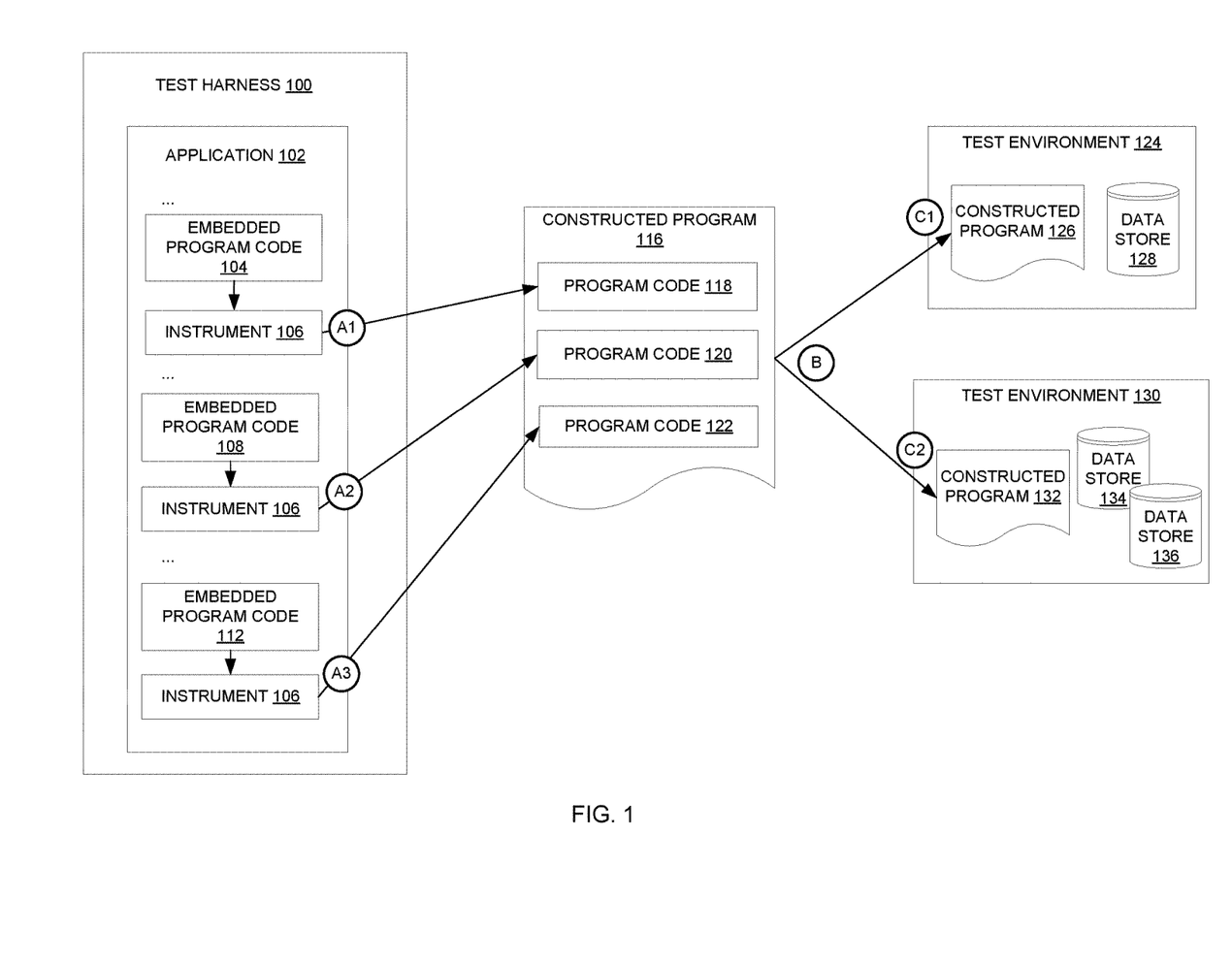
FIG. 1 depicts a testing framework constructing and executing an SQL program code.

FIG. 1 depicts a testing framework constructing and executing an SQL program code. In FIG. 1, an application 102 executes within a test harness 100. The test harness 100 includes stubs, drivers, and data for testing the application 102. The application 102 includes program code written in a primary programming language (e.g., the Java programming language) and program code embedded within that is written in at least one secondary programming language. In this illustration, the application 102 contains embedded program codes 104, 108, and 112 written, for example, in an interpreted programming language. The application 102 includes an instrument 106. When activated, the instrument 106 detects, and/or intercepts embedded code selected for external testing and incrementally constructs a program, external to the application, with the detected code.

FIG. 1 is annotated with a series of letters A(A1-A3)-C (C1-C2). These letters represent stages of operations. Although these stages are ordered for this example, the stages illustrate one example to aid in understanding this disclosure and should not be used to limit the claims. Subject matter falling within the scope of the claims can vary with respect to the order of the operations.

Figure 2:
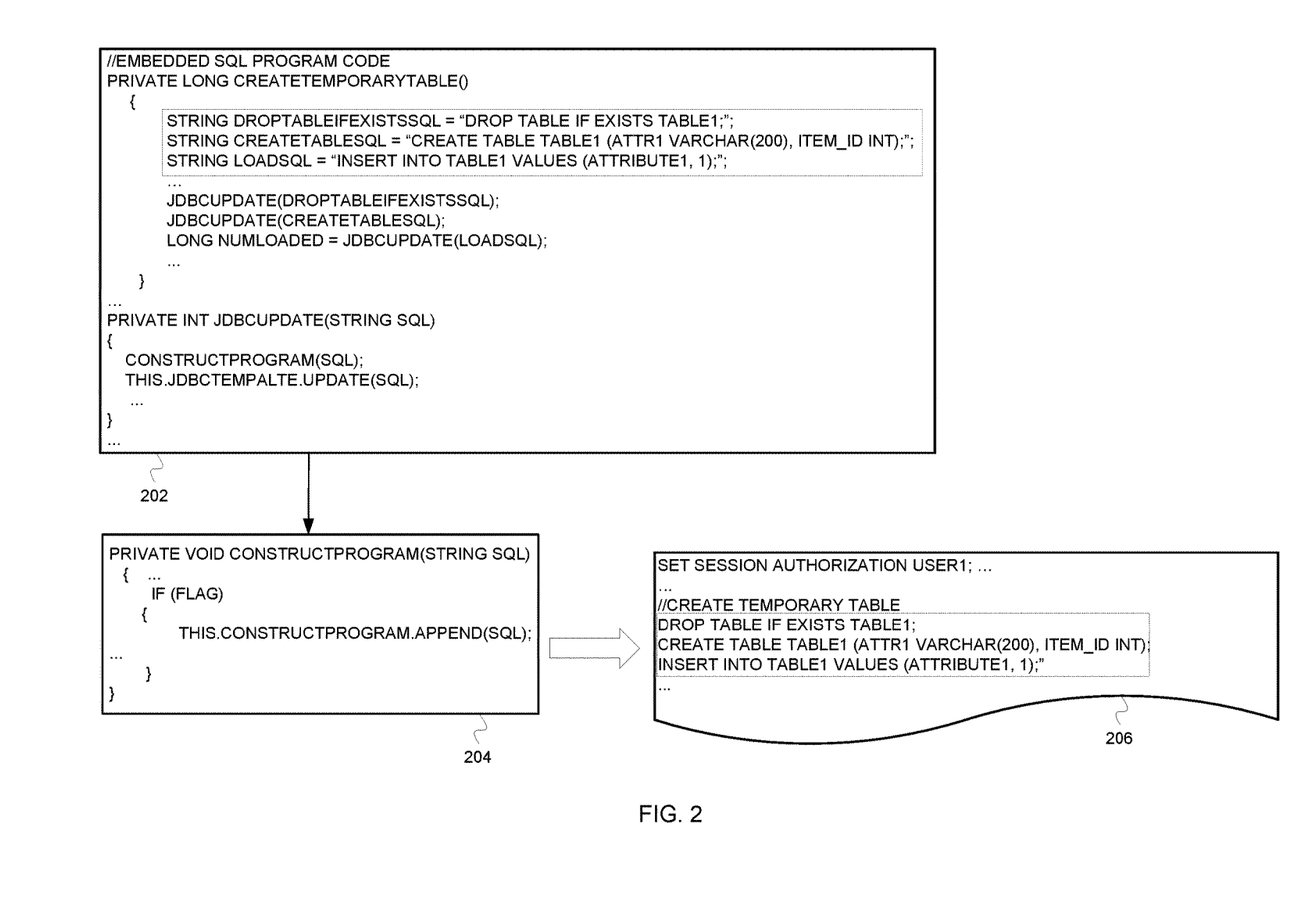
FIG. 2 depicts example application program code with embedded program code and an instrument that incrementally constructs an externally testable program from the embedded program code.

Prior to stage A1, the application 102 is executed in the test harness 100. With the test harness, the entire application 102 can be executed or a selected part of the application 102 can be executed. This example illustration presumes that at least a part of the application 102 is executed that traverses the embedded program code 104, the embedded program code 108, and the embedded program code 112, as well as the instrument 106. FIG. 2 provides an example code snippet that illustrates incremental construction of SQL program code embedded within a Java code snippet.

FIG. 2 depicts example application program code with embedded program code and an instrument that incrementally constructs an externally testable program from the embedded program code. In FIG. 2, the primary language is the Java program language and the secondary language is SQL. A code snippet 202 includes embedded program that stores three SQL strings into three variables to be passed to three calls to a Java database connectivity (JDBC) defined method "JDBCUPDATE." The first string "DROP TABLE IF EXISTS TABLE 1" is stored in the variable "DROPTABLEIFEXISTSSQL." The second string "CREATE TABLE TABLE1 (ATTR1 VARCHAR(200), ITEM_ID INT);" is stored in the variable "CREATETABLSQL." The third string "INSERT INTO TABLE1 VALUES (ATTRIBUTE1, 1);" is stored in the variable "LOADSQL." Although this example illustration directly sets the variables to defined strings for an easy to understand example, the embedded program code may be generated as output from another method/function. Each of these illustrated string variables is separately passed to the "JDBCUPDATE" method in a sequence of calls to the method.

The method JDBCUPDATE includes a call to an instrument "CONSTRUCTPROGRAM" 204. The instrument 204 determines if an instrument flag is true. If the instrument flag is true, the instrument 204 calls a function THIS.CONSTRUCTPROGRAM.APPEND to append the string passed to the instrument to a specified target (e.g., file). In this example, the target is specified outside of the instrument 204, but could be specified within the instrument 204. With each write to the target, the instrument 204 incrementally construct a program 206 external the application that includes the code snippet 202.

Returning to FIG. 1, the instrument 106 detects the embedded program code 104 and writes it to target at stage A1. As shown in FIG. 2, the embedded program code 104 may be a string passed to a function that executes/interprets the embedded program code 104 in a different environment, interpreter, or virtual machine. With the presumption that the instrument 106 is active, the instrument 106 writes the embedded program code 104 to incrementally build a constructed program 116. This is repeated at stage A2 for the embedded program code 108 and at stage A3 for the embedded program code 112. The instrument 106 writes the embedded program code 104, the embedded program code 108, and the embedded program code 112 into the constructed program 116 as program code 118, program code 120, and program code 122. This illustrates that the instrument may copy the detected program code to a target or may write a derivative of the detected program code. The instrument can be designed to modify program code before writing out to the target for program construction. For instance, the instrument may remove and/or modify table names or global variables.

At stage B, the program 116 is loaded into test environments 124 and 130 as constructed programs 126 and 132, respectively. Because the constructed program 116 comprises of an interpreted language (i.e., SQL statements), the constructed program 116 is not compiled, nor an installer built to deploy or copy the constructed program 116 to the test environments 124 and 130. In addition, the constructed program 116 can be executed independently of the application 102 without the application 102 being compiled and/or deployed in the test environments 124 and 130. Because the application 102 will not be deployed in the test environments 124 and 130, an installer is also not built. The constructed program 116 may be loaded to at least one environment for debugging and/or evaluation. Because no time is spent compiling, deploying and/or building an installer the constructed program 116 can be evaluated efficiently.

At stage C, the programs 126 and 132 are executed in the test environments 124 and 130. The programs 126 and 132 are executed independently of the application 102 and of each other. The test environments 124 and 130 contain infrastructure (e.g., test harness, interpreter, virtual machine, etc.) that can run the SQL statements in the programs 126 and 132. Since the constructed program 116 can be efficiently evaluated, it can be efficiently evaluated at different scales of deployment.

The test environment 124 comprises a data store 128. The data store 128 contains mock data to evaluate the functionality of the program 126 at a small scale. The test environment 130 comprises the data stores 134 and 136. The data stores 134 and 136 contain data at a larger scale. The test environment 130 is used for testing the performance of the constructed program 132 against a larger and/or richer dataset. The constructed programs 126 and/or 132 can be changed and the changes immediately tested without the overhead of compiling and deploying the application 102 or installing an update for the application 102.

Figure 3:
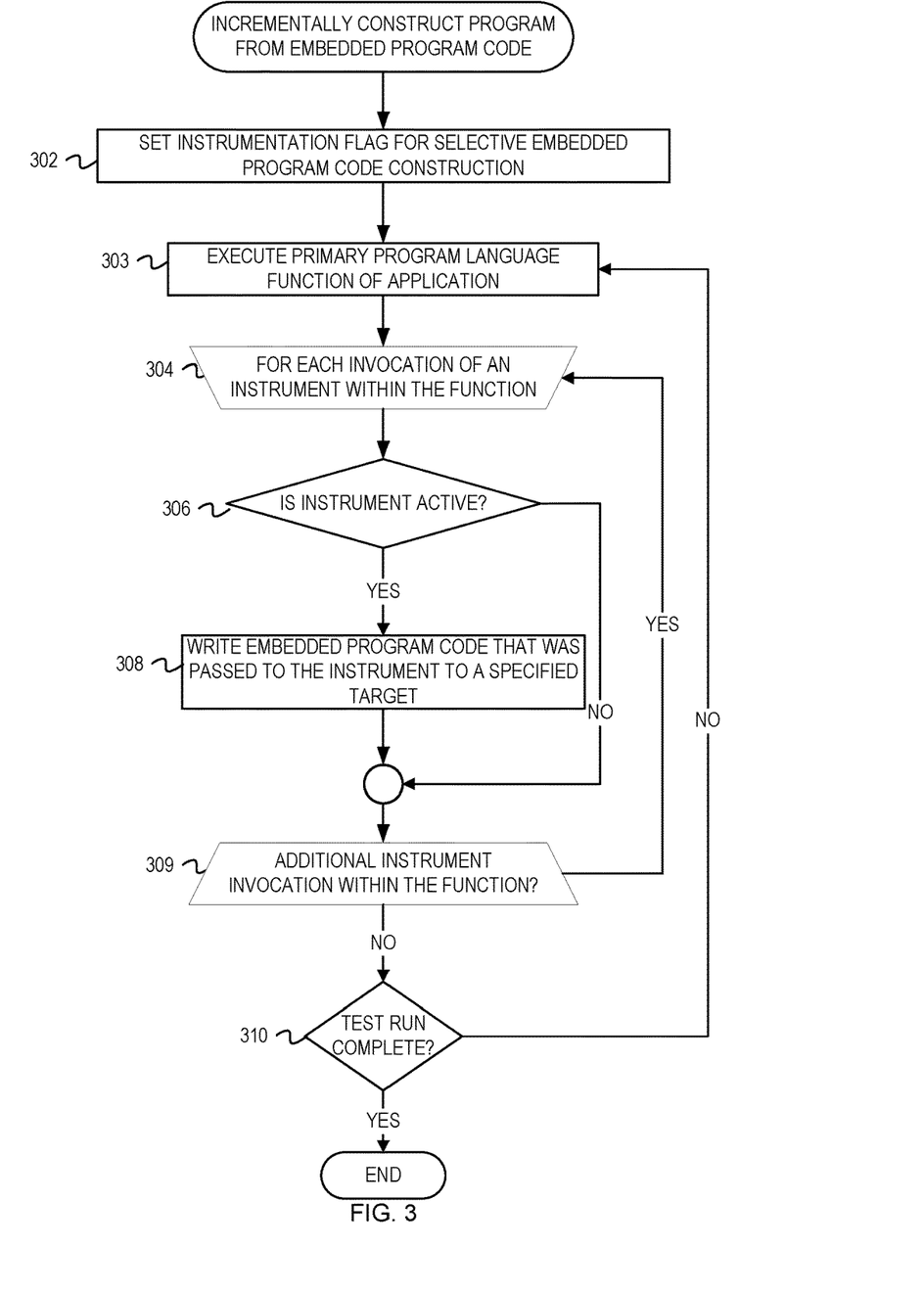
FIG. 3 depicts a flowchart for constructing a program from embedded program code.

FIG. 3 depicts a flowchart for constructing a program from embedded program code. The example operations of FIG. 3 are performed as part of executing the application or part of the application that includes embedded program code. The operations determine whether an instrument that incrementally constructs an external program from embedded program code is active and then performs the construction.

The application sets an instrument flag for selective embedded program code construction to indicate active (302). The instrument flag is a flag or value that indicates whether the incremental constructor instrument is active.

A function of the primary program code of the application is executed (303). The function may include 0 to n invocations of the instrument (304). Placement of the instrument within the application can vary. A function that contains a call to the instrument can be inside or outside of a function containing the embedded program code.

If the invoked instrument is active for incremental construction based on the instrument flag (306), then the instrument writes or appends the embedded program code that was passed to the instrument to a specified target (308). The target may have been specified prior to the invocation of the instrument. The specified target can be a file or a data structure. The embedded program code may be transformed into a format to conform to an expected test environment and/or interpreter before the instrument writes the transformed embedded program code to a specified target. For example, the instrument may set variables in the embedded program code that indicate the resource and/or test environment (e.g., different test data, database name, etc.) for running the constructed program. In addition, the instrument may be programmed to include program code(s), such as setting permissions or authorization, to enable running the constructed program. Usually, the embeddable programming language is an interpreted programming language. The instrument can be a separate function as depicted in the instrument 204 of FIG. 2. The instrument can also be a function that is independent of other function calls. The execution flow continues and may traverse multiple other instrument invocations within the function (309). If the test run of the application is not yet complete (310), then execution of the application continues.

Figure 4:
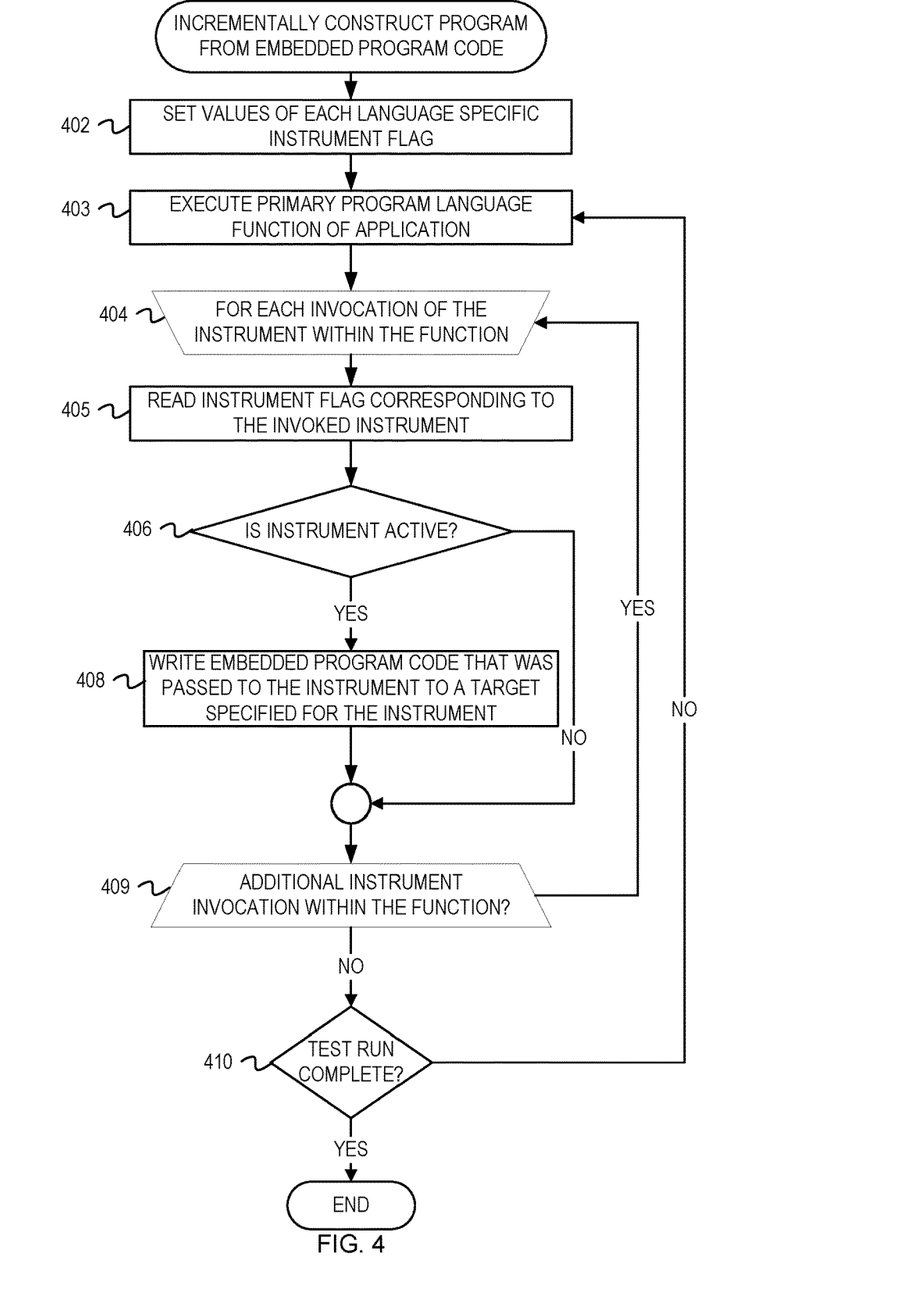
FIG. 4 depicts a flowchart for constructing a program from embedded program code of different secondary programming languages.

FIG. 4 depicts a flowchart for constructing a program from embedded program code of different secondary programming languages. The example operations of FIG. 4 are performed as part of executing the application or part of the application that includes embedded program code. The operations determine which of multiple language specific instruments that incrementally construct external programs from embedded program code is active, if any, and then perform the construction.

The application sets values of each language specific instrument flag for selective embedded program code construction (402). Each language specific instrument flag indicates whether the incremental constructor instrument for a corresponding language specific instrument is active. The application may have embedded code written in at least 2 secondary programming languages. Each of the secondary programming languages has a corresponding language specific instrument. An instrument for a specific programming language detects and/or intercepts the embedded code written in the corresponding programming language selected for external testing and incrementally constructs a program, external to the application, with the detected code.

As the application (or application part) executes, functions of the primary program code are executed (403). A function may include 0 to n invocations of the multiple language specific instruments (404). Placement of each of the multiple language specific instruments within the application can vary. A function that contains a call to the language specific instrument can be inside or outside of a function containing the embedded program code written in the corresponding programming language.

The language specific instrument flag corresponding to the invoked language specific instrument is read (405). For instance, an instrument for secondary programming language "A" reads the A instrument flag to determine whether the A instrument is active. If the invoked language specific instrument is active for incremental construction based on the language specific instrument flag (406), then the language specific instrument writes or appends the embedded program code that was passed to the language specific instrument to a target specified for the instrument (408). The target may have been specified prior to the invocation of the language specific instrument and is specific to a particular programming language. The specified target can be a file or a data structure. The embedded program code may be transformed into a format to conform to an expected test environment, and/or interpreter before the language specific instrument writes the transformed embedded program code to a specified target. Each language specific instrument can be a separate function as depicted in the instrument 204 of FIG. 2. Each language specific instrument can also be a function that is independent of other function calls. The execution flow continues and may traverse multiple other language specific instrument invocations within the function (409). If the test run of the application is not yet complete (410), then execution of the application continues.

Variations

The above examples refer to incrementally constructing a program from embedded program code to efficiently test the embedded program independent of the host application. The constructed program can be modified as part of testing the constructed program code. In some cases, a modification, such as a correction or optimization, may be injected back into the application. The construction instrument can be programmed to record location information of embedded program code to aid in this injecting of modifications of embedded program code. In addition, the constructed program code can be leveraged to efficiently evaluate embedded program code for a different database system. For example, a host application code contains embedded program codes written in SQL for a Vertica® database system. However, a new customer may use a different database system, such as an Oracle® database system or an MS SQL Server® database system in addition to, or in lieu of the Vertica database system. To efficiently update the application or create a new version of the application that will be compatible with the different database system, the selective testing framework can run a constructed program (or part of the constructed program) against the second database system to determine issues, if any. Some or all of the program codes in the constructed program can be modified according to the syntax of the second database system. The modified program code can then be ported into the application.

In another embodiment, a translator can translate the constructed program code into a specified programming language and the translated version of the constructed program can be tested. The translation can be inline with construction (i.e., embedded program code is translated prior to being written to a target) or post construction (i.e., translate the constructed program). Augmenting the testing framework with translation functionality allows for rapid testing across different database system and efficient porting of the application. The translator may translate based on mappings of terms between the embedded program language and another programming language. The translator then replaces the terms according to the mappings. For example, the term "CEIL" used for Oracle database systems, is equivalent to the term "CEILING" used for MS SQL Server database systems. The translator replaces each occurrence of the "CEIL" with "CEILING." After testing the translated version of the constructed program, the application code can be updated with the translated version to be run in an MS SQL Server database system environment. Embedding of the translated version of the constructed program can be guided by the location information recorded by the instrument when incrementally constructing the constructed program.

The above examples refer to constructing a program from embedded program code, wherein the application contains an instrument for a specific programming language of the embedded program code. Embodiments can use other techniques to construct a program when the application contains embedded program codes written in two or more programming languages. For example, an instrument can be programmed to identify the programming language of the embedded code string passed to it. This "intelligent" instrument may identify the programming language used in writing the embedded program code by parsing the embedded program code passed to the intelligent instrument. The intelligent instrument may use regular expressions to match words in the parsed embedded program code to keywords distinct for a particular programming language. For example, if the parsed embedded program code contains the word "SELECT" or "INSERT," there is a strong probability that the embedded program code is written in an SQL programming language. In another example, a parameter that identifies the programming language of the embedded program code may be passed to the instrument when invoked by a function. In another example, the instrument may also use reflection to determine the method name of the caller function. For example, if the caller function name contains the word "JDBC", there is a strong probability that the embedded program code is written in an SQL programming language.

The examples often refer to an "instrument." The instrument is a construct used to refer to an implementation of the functionality for detecting and/or intercepting embedded code. This construct is utilized since numerous implementations are possible. The term is used to efficiently explain the content of the disclosure. The instrument can also be referred to as an agent. Although the examples refer to operations being performed by an instrument, different entities can perform different operations. For instance, a dedicated co-processor or application specific integrated circuit can detect and/or intercept embedded code.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of the platform (operating system and/or hardware), application ecosystem, interfaces, programme preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or a combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object-oriented programming language such as the Java® programming language, C++ or the like; a dynamic programming language such as Python; a scripting language such as Perl® programming language or PowerShell® script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
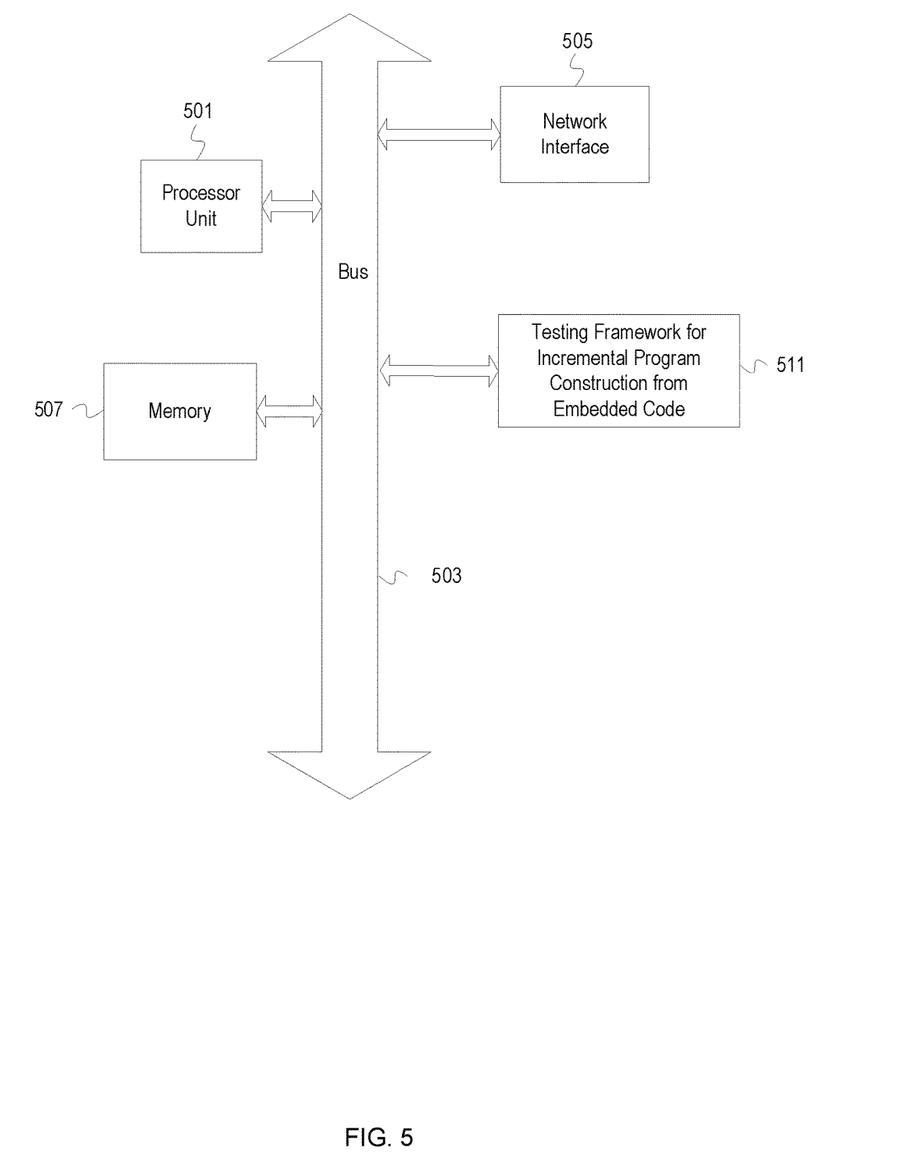
FIG. 5 depicts an example computer system with a testing framework for incremental program construction from embedded code.

FIG. 5 depicts an example computer system with a testing framework for incremental program construction from embedded code. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a testing framework for incremental program construction from embedded code 511. The testing framework 511 detects when embedded program code strings are traversed during execution of a hosting application and incrementally constructs a program from the embedded program code strings that are detected. The testing framework 511 then tests the constructed program independent of the host application. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for incrementally constructing a program from embedded secondary program code strings detected during execution of a host application as described herein may be implemented with facilities consistent with any hardware system or hardware systems. Many variations, modifications, additions and improvements are possible.

Plural instances may be provided for components, operations or structures described herein as a single instance.

Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    executing a first program that comprises first program code of a first programming language, second program code of a second programming language embedded as strings within the first program code, and an embedded code processing instrument within a function of the first program code, said executing the first program including,
        invoking, by the first program code function, the embedded code processing instrument;
        detecting, by the embedded code processing instrument, at least a subset of the strings within the first program code function;
        incrementally constructing, by the embedded code processing instrument, a second program from the subset of the strings, said incrementally constructing comprising, for each string individually detected within a first programming language construct, individually writing the string to the second program; and
    testing the second program independently of the first program.

2. The method of claim 1, wherein incrementally constructing the second program comprises writing to a target each of the subset of the strings in sequence as detected.

3. The method of claim 1, wherein incrementally constructing the second program comprises modifying at least a first of the subset of strings and writing the modified string to a target.

4. The method of claim 1, wherein testing the second program independently of the first program comprises running the second program in a different testing environment than the first program.

5. The method of claim 1, further comprising modifying the second program prior to running the second program.

6. The method of claim 5, wherein modifying the second program comprises setting variables within the second program to indicate different test data.

7. The method of claim 1, further comprising:
    recording location information of each string of the subset of strings within the first program corresponding to the detecting;
    translating the subset of the strings from the second programming language to a third programming language to generate a third program;
    testing the third program independently of the first program; and
    updating the first program by embedding the translated subset of the strings into the first program based on the recorded location information.

8. The method of claim 1, further comprising recording location information of each string of the subset of strings within the first program corresponding to the detecting.

9. One or more non-transitory machine-readable media comprising program instructions for incrementally constructing a program from embedded program code, the program instructions to:
    execute a first program that comprises first program code of a first programming language, second program code of a second programming language embedded as strings within the first program code, and an embedded code processing instrument within a function of the first program code, said executing the first program including,
        detecting, by the embedded code processing instrument, at least a subset of the strings within the first program code function;
        incrementally constructing, by the embedded code processing instrument, a second program from the detected subset of the strings, said incrementally constructing comprising, for each string individually detected within a first programming language construct, individually writing the string to the second program; and
    test the second program independent of the first program.

10. The machine-readable media of claim 9, wherein the program instructions to incrementally construct the second program comprise program instructions to write to a target each of the subset of the strings in sequence as detected.

11. The machine-readable media of claim 9, wherein the program instructions to incrementally construct the second program comprise program instructions to modify at least a first of the subset of the strings and write the modified string to a target.

12. The machine-readable media of claim 9, wherein the program instructions to test the second program independently of the first program comprise program instructions to test the second program in a different testing environment than the first program.

13. The machine-readable media of claim 9, further comprising program instructions to modify the second program including setting variables within the second program to indicate different test data prior to running the second program.

14. The machine-readable media of claim 9, wherein the program instructions further comprise program instructions to:
    record location information of each string of the subset of strings within the first program corresponding to the detecting;
    translate the subset of the strings from the second programming language to a third programming language to generate a third program;
    test the third program independently of the first program; and
    update the first program by embedding the translated subset of the strings into the first program based on the recorded location information.

15. An apparatus comprising:
    a processor; and a machine-readable medium comprising program instructions executable by the processor to cause the apparatus to, execute a first program that comprises first program code of a first programming language, second program code of a second programming language embedded as strings within the first program code, and an embedded code processing instrument within a function of the first program code, said executing the first program including,     detecting, by the embedded code processing instrument, at least a subset of the strings within the first program code function;

incrementally constructing, by the embedded code processing instrument, a second program from the detected subset of the strings, said incrementally constructing comprising, for each string individually detected within a first programming language construct, individually writing the string to the second program; and test the second program independent of the first program.

16. The apparatus of claim 15, wherein the program instructions executable by the processor to cause the apparatus to:

incrementally construct the second program comprise program instructions to write to a target each of the subset of the strings in sequence as detected.

17. The apparatus of claim 15, wherein the program instructions executable by the processor to cause the apparatus to:

incrementally construct the second program comprise program instructions to modify at least a first of the subset of the strings and write the modified string to a target.

18. The apparatus of claim 15, wherein the program instructions executable by the processor to cause the apparatus to test the second program independently of the first program comprise program instructions to test the second program in a different testing environment than the first program.

19. The apparatus of claim 15, wherein the program instructions executable by the processor to cause the apparatus to modify the second program comprise program instructions to set variables within the second program to indicate different test data.

20. The apparatus of claim 15, wherein the program instructions executable by the processor to cause the apparatus to:

record location information of each string of the subset of strings within the first program corresponding to the detecting;

translate the subset of the strings from the second programming language to a third programming language to generate a third program;

test the third program independently of the first program; and     update the first program by embedding the translated subset of the strings into the first program based on the recorded location information.

\* \* \* \* \*